United States Patent

Johnson et al.

[15] 3,656,835

[45] Apr. 18, 1972

[54] MODULATION BY A MAGNETIC FIELD OF ELECTROMAGNETIC RADIATION PRODUCED BY THE DECAY OF TRIPLET STATES

[72] Inventors: Robert C. Johnson; Richard E. Merrifield, both of Wilmington, Del.

[73] Assignee: E. I. du Pont de Nemours and Company, Wilmington, Del.

[22] Filed: Aug. 26, 1969

[21] Appl. No.: 853,183

Related U.S. Application Data

[63] Continuation-in-part of Ser. No. 724,420, Apr. 26, 1968, abandoned, which is a continuation-in-part of Ser. No. 648,883, June 26, 1967, abandoned.

[52] U.S. Cl. ....................350/160

[51] Int. Cl. ....................G02f 1/16

[58] Field of Search ....................350/160 P; 252/300, 301.2, 252/301.3

[56] References Cited

UNITED STATES PATENTS 3,214,382 10/1965 Windsor ....................350/160 P 3,214,383 10/1965 Moore et al. ....................350/160 P

*Primary Examiner*—William L. Sikes

*Attorney*—James H. Ryan

[57] ABSTRACT

This disclosure describes a process and devices for modulating electromagnetic radiation, e.g., visible light, by means of variation in a magnetic field on a substance, e.g., anthracene, pyrene, diphenylanthracene, etc., in which triplets can be created, with the triplets subsequently decaying and thereby causing said substance to emit electromagnetic radiation, e.g., to fluoresce.

16 Claims, 15 Drawing Figures

Figure 1A:
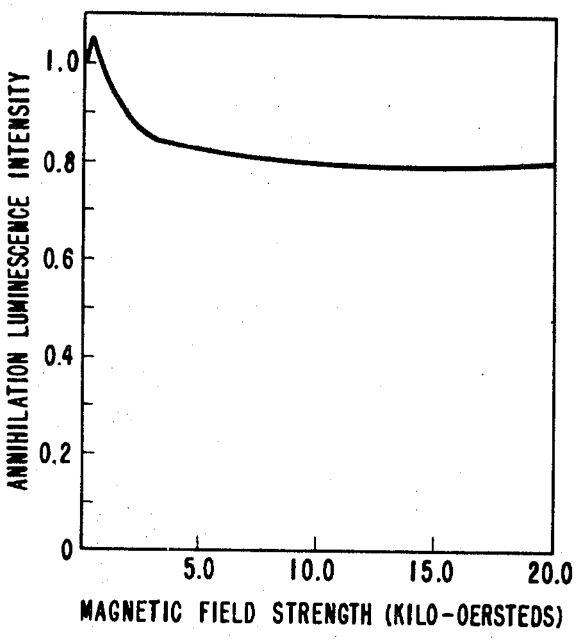

*INVENTORS*
ROBERT C. JOHNSON
RICHARD E. MERRIFIELD

BY James H. Ryan
*ATTORNEY*

LEGEND

——— IRRADIATED 4 X $10^3$ RADS ANTHRACENE

– – – – NON-IRRADIATED ANTHRACENE

INVENTORS
ROBERT C. JOHNSON
RICHARD E. MERRIFIELD

BY James H. Ryan
ATTORNEY

*INVENTORS*
ROBERT C. JOHNSON
RICHARD E. MERRIFIELD

BY James H. Ryan
*ATTORNEY*

INVENTORS
ROBERT C. JOHNSON
RICHARD E. MERRIFIELD

BY James H. Ryan
ATTORNEY

MODULATION BY A MAGNETIC FIELD OF ELECTROMAGNETIC RADIATION PRODUCED BY THE DECAY OF TRIPLET STATES

RELATED APPLICATION

This application is a continuation-in-part of our copending application Ser. No. 724,420 filed Apr. 26, 1968, as a continuation-in-part of Ser. No. 648,883, filed June 26, 1967 both prior applications now abandoned.

BACKGROUND OF THE INVENTION

1. Field of the Invention

This invention relates to, and has as its principal objects provision of, a process and devices for modulating or changing the intensity of the light resulting from the decay of triplet states.

2. Description of the Prior Art

An exciton in a crystal or region of a crystal is an internally mobile, electronically excited state which can internally transport energy but not charge. A triplet exciton is one in which the electronically excited state in question bears one unit of spin (arising from two unpaired electrons). Excitons, once created in a crystal, do not persist indefinitely, but decay by a monomolecular process characterized by a lifetime $\tau$. In the case of triplet excitons, the energy given up in this monomolecular decay process can either appear as heat or as light (phosphorescence).

The rate of monomolecular decay process is usually increased if impurities are added to a pure crystal. This shortening of the triplet lifetime is called "quenching." Paramagnetic species, e.g., free radicals, are particularly effective quenchers of triplets. Paramagnetic impurities can be introduced into a crystal by cocrystallization with the host material or by diffusion of the impurity into a pure crystal or they can be produced in situ by exposing a crystal to high energy radiation, e.g., X-rays. Examples of paramagnetic impurities are oxygen, nitric oxide, substituted hydrazyls such as diphenylpicrylhydrazyl, nitroxides such as di-tert-butyl nitroxide, and N-nitrosodiarylamines such as N-nitrosodiphenylamine. The impurities can be incorporated in the pure crystals in amount and by procedures well known to those skilled in the art. The quenching of triplet excitons in anthracene crystals by free radicals produced by X-irradiation of the pure crystal is disclosed by C. Z. Weisz et al., Mol. Crystals 3, 1968 (1967).

In some crystals, triplet excitons can also disappear by a second, bimolecular, process, termed mutual annihilation, in which a pair of excitons meet and combine their energy to yield a single, higher energy, singlet exciton (one with zero spin, i.e., all electrons paired). This singlet exciton, which normally has a much shorter lifetime than the triplet exciton, subsequently disappears with emission of light. The light produced in this manner is usually termed "delayed fluorescence" to distinguish it from the more usual "prompt fluorescence" which results when the singlet exciton is produced directly by absorption of light.

Crystals in which triplet excitons can be created can be classified according to whether they show phosphorescence, delayed fluorescence, or both. These classes of crystals are discussed in more detail below.

The process of mutual annihilation of triplets leading to delayed fluorescence and the process of phosphorescent emission from triplets can take place in fluid systems as well as in crystals. In the former case the triplets involved are simply triplet states of molecules rather than excitons. In the following the term "triplet" will refer to a molecule in a triplet state for fluid systems and to a triplet exciton for crystalline substances.

The exciton has been studied extensively, both theoretically and experimentally. See, for example, Dexter and Knox, *Excitons*, Interscience Publishers, Inc., New York (1964), and Knox in Solid State Physics, Academic Press, New York, Suppl. 5 (1963). The triplet-triplet annihilation process is discussed in some detail by R. G. Kepler, J. C. Caris, P. Avakian and E. Abramson, Phy. Rev. Letters, 10, 400 (1963) and by P. Avakian and E. Abramson, J. Chem. Phys. 43, 821 (1965). The process of triplet-triplet annihilation in fluid systems is described by C. A. Parker, *The Triplet State*, A. B. Zahlan, Ed., pp. 353–359, The University Press, Cambridge (1967).

DETAILS OF THE INVENTION AND DRAWINGS

In accordance with the present invention, it has been found that, when a substance in which triplets can be created is excited to produce triplets and a magnetic field is applied thereto, the intensity of electromagnetic radiation resulting from the decay of the triplets changes with variation in the strength of the applied magnetic field. The triplets can be either triplet excitons in the case of a crystalline substance or molecular triplet states in the case of fluid system, e.g., a solution. The electromagnetic radiation that is influenced by the magnetic field includes, in the presence of paramagnetic quenching, both delayed fluorescence and phosphorescence, and is restricted, in the absence of such quenching, to delayed fluorescence.

For triplet excitons in a crystalline substance in the absence of paramagnetic quenching, the delayed fluorescence intensity increases in low magnetic fields, reaching a maximum increase at some field strength ca. 1000 Oe or less. Further increase in the field strength results in a decrease in delayed fluorescence intensity up to a field of ca. 5000 Oe, at which point the intensity has decreased to less than the zero-field value.

In some crystalline substances one or more peaks in intensity, in addition to the initial low-field peak, are observed as the field strength is increased. For sufficiently high field strengths very little further change in intensity takes place as the field strength is increased.

The intensity of electromagnetic radiation also depends on the direction of the applied magnetic field, and in some crystalline substances there are observed to be directions of applied magnetic field for which one or more of the peaks in intensity of electromagnetic radiation are not discernible as the field strength is increased.

The effect of a magnetic field on the exciton annihilation process does not depend on the source of the triplet exciton. Thus, optically created triplet excitons in which activating radiation of one wavelength excites the emission of radiation of a different wavelength are useful as shown in detail below. The process, however, is equally operable with excitons created in any other manner, e.g., by recombination of electrons and holes which are introduced into the crystal by means of injecting electrodes. For example, in the case of crystalline anthracene, an electron-injecting electrode can consist of a solution of the sodium salt of anthracene in tetrahydrofuran while a hole-injecting electrode can consist of a solution of anthracene and $AlCl_3$ in nitromethane. Production of triplet excitons in anthracene by the injection process is disclosed by W. Helfrich and W. G. Schneider, J. Chem. Phys. 44, 2902 (1966).

The effect of a magnetic field in changing the emitted electromagnetic radiation, i.e., delayed fluorescence, resulting from the mutual annihilation of triplet excitons, results in crystals of any material in which the mutual annihilation process takes place. Such materials include both:

1. Crystals showing delayed fluorescence but not phosphorescence: 9,10-diphenylanthracene, 9,9′-bianthryl, naphthalene, phenanthrene, p-terphenyl, trans-stilbene, tetracene and 2-methylpyrene; and 2. Crystals showing both phosphorescence and delayed fluorescence: anthracene, 4,5-iminophenanthrene, and 4,5-methylenephenanthrene.

In the case of delayed fluorescence in fluid systems, operable solvents are those in which triplet-triplet annihilation leading to delayed fluorescence can take place. These solvents must dissolve the solute to some extent, must be inert to the solute, and must be transparent to exciting and emitted light. Inoperable solvents are those which quench molecular fluorescence, e.g., by reacting with the solute or by containing iodine. Specific operable solvents include alcohols, such as methyl, ethyl, isopropyl, tert-butyl, and 2-ethylhexyl alcohols; hydrocarbons such as methylcyclopentane, heptane, isooctane, and toluene; ethers, including polyethers and cyclic ethers, such as ethyl ether, butyl ether, 1,2-dimethoxyethane, tetrahydrofuran, and dioxane; esters, such as ethyl acetate, methyl propionate, and ethyl isobutyrate; ketones, such as acetone, 2-butanone and cyclohexanone; and fluorinated and chlorinated hydrocarbons, such as chloroform, ethylene chloride, chlorobenzene, fluorobenzene and 1,1,2-trichloro-1,2,2-trifluoro-ethane.

With materials in which triplet-triplet annihilation leading to delayed fluorescence takes place, the introduction of paramagnetic impurities leads to a change in the magnetic field dependence of delayed fluorescence intensity as a result of the combined effects of the field on the annihilation and quenching processes. This change consists of a more rapid increase of delayed fluorescence intensity at low fields, a greater maximum increase, and an extended range of field strengths which produce an increase in intensity.

For materials in which the monomolecular decay of the triplet is accompanied by the emission of light (phosphorescence) the introduction of paramagnetic impurities also leads to a magnetic field-dependence of the phosphorescence lifetime and intensity, regardless of whether or not the material is one in which triplet-triplet annihilation takes place. The phosphorescence lifetime and intensity are typically a minimum at zero field and increase as a field is applied up to a field strength of ca. 2000 Oe, above which field little further change takes place. This effect is observed in crystals of the second class of crystals numbered above, and in addition in crystals of a third class, i.e., those showing phosphorescence but not delayed fluorescence. Examples are carbazole, N-phenylcarbazole, benzophenone, dibenzofuran, and triphenylene.

The effect of a paramagnetic impurity results from the fact that the quenching of triplets by a paramagnetic species is altered in the presence of a magnetic field. The quenching is a maximum at zero field and decreases as a magnetic field is applied, typically decreasing to ca. 90 percent of the zero-field quenching rate for a field of ca. 2000 Oe. Little further change in quenching rate takes place as the field is increased beyond this value. The field dependence of the quenching is manifested by a corresponding field dependence of the triplet lifetime. (Triplet lifetimes in pure materials or when quenched by nonparamagnetic impurities are insensitive to magnetic fields of these magnitudes at room temperature.)

The effects of magnetic fields on phosphorescence lifetime and intensity discussed in the foregoing two paragraphs can also take place in solution. Operable solvents are the same as those, discussed above, in which triplet-triplet annihilation leading to delayed fluorescence can take place.

Figure 1B:
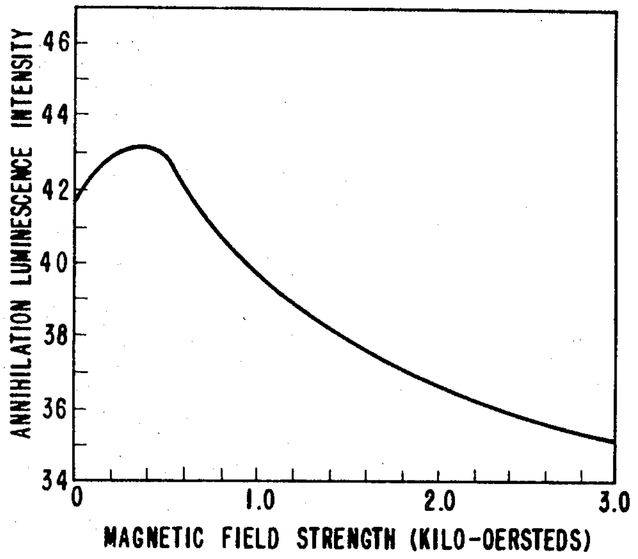
Figures 2A, 2B, 2C:
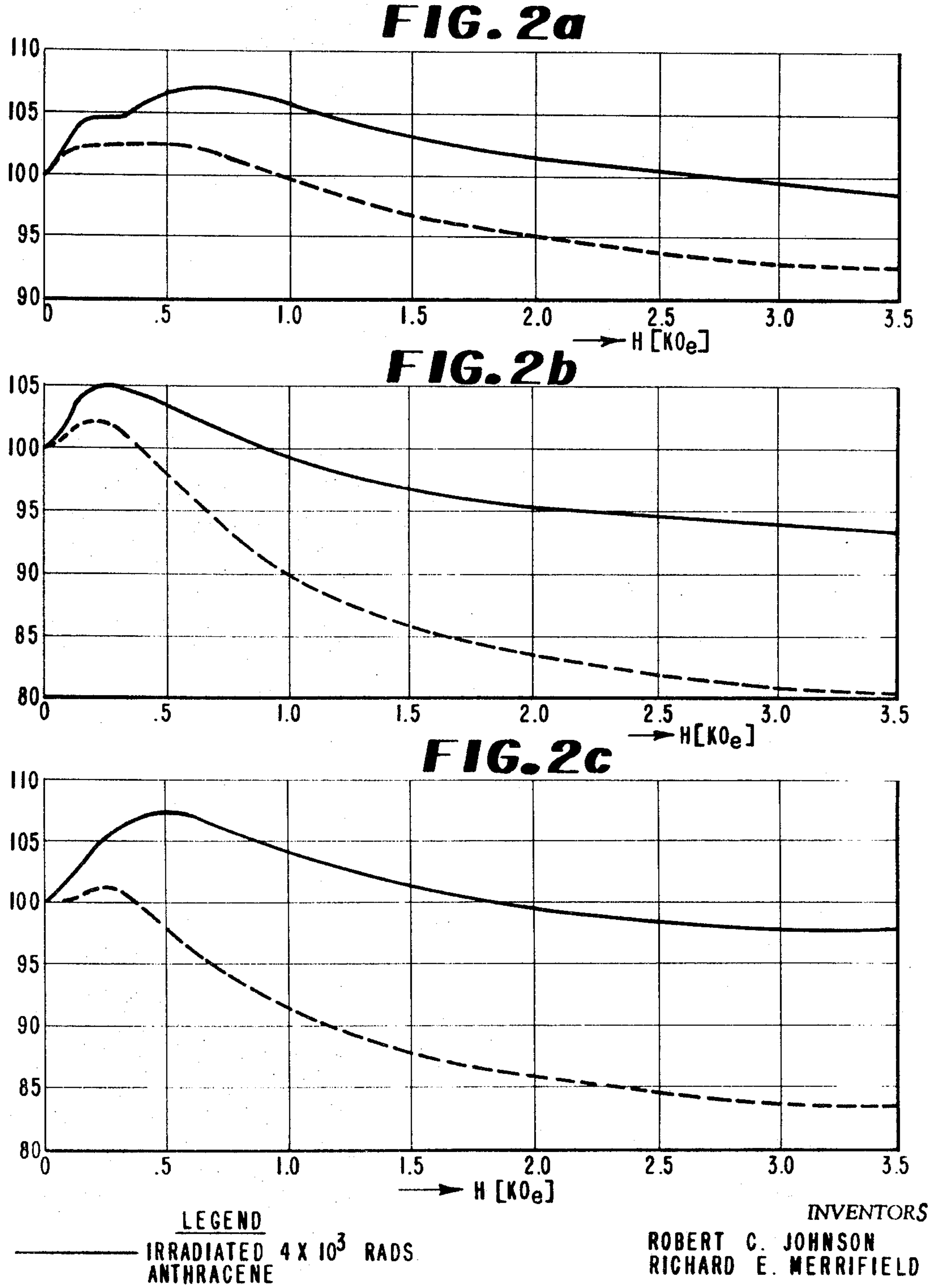
Figure 3A:
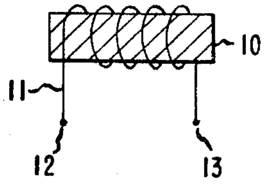
Figure 3B:
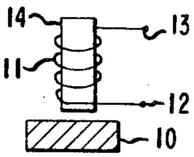
Figure 4:
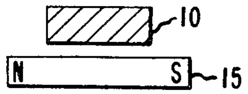
Figure 5:
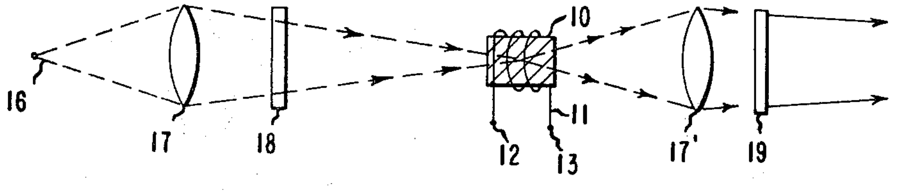
Figure 6:
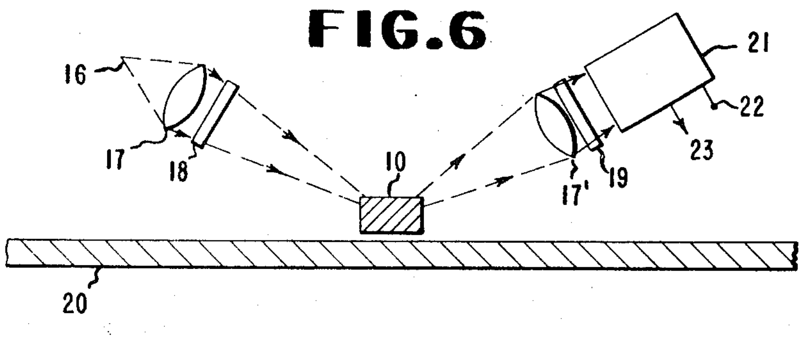
Figure 7:
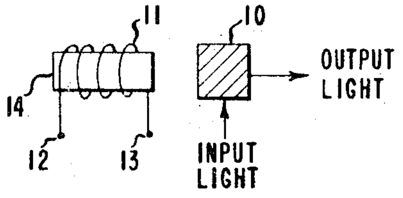
Figure 8:
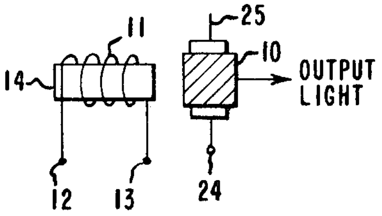
Figure 9:
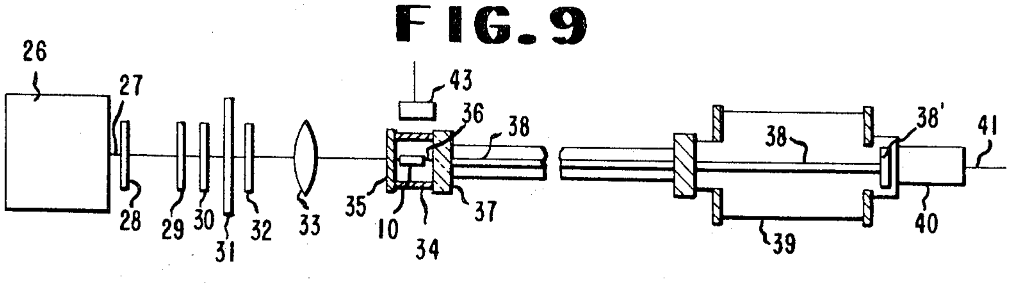
Figure 10:
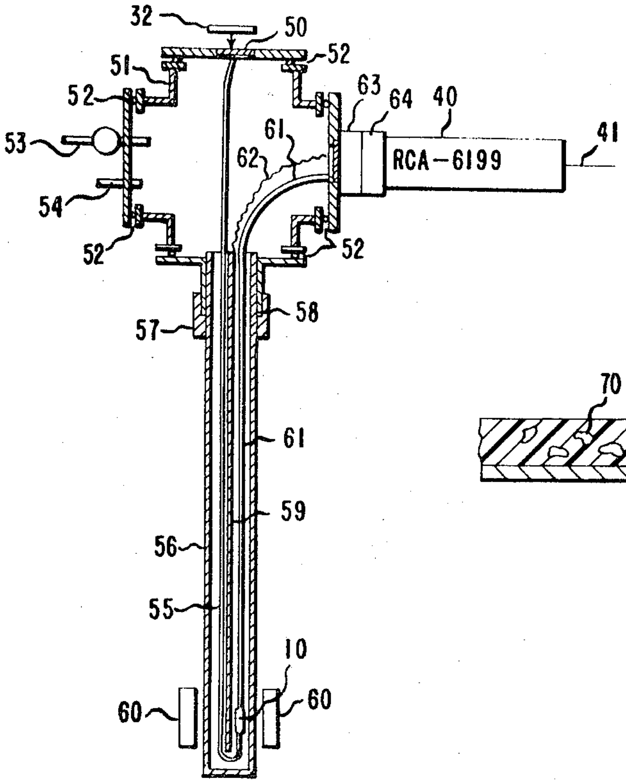
Figure 11:
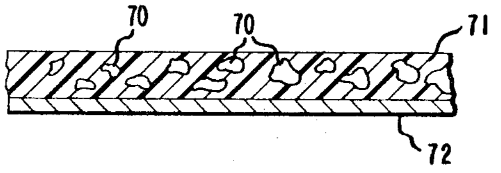

The invention will be understood in more detail from the remainder of the specification and from the drawings wherein the common numerals represent the same parts and in which:

FIG. 1*a* is a plot of annihilation luminescence intensity *v.* magnetic field strength in an anthracene crystal (roughly 7 × 9 × 14 mm. in size) at room temperature (ca. 25°C.);

FIG. 1*b* is a plot quite similar to that of FIG. 1*a* except that the anthracene crystal was at 4.2°K. (see Example 1, below);

FIGS. 2*a*, *b* and *c* are plots of delayed fluorescence activity *v.* magnetic field strength in anthracene crystals (3 × 5 × 10 mm.) irradiated (solid line) with 4 × $10^3$ rads of X-rays and unirradiated (broken line). In each plot, the field is in the plane of the *a* and *b* crystal axes; in *a* it is parallel to the *a* axis, in *b* it is at an angle of 25° with the *b* axis, and in *c* it is parallel to the *b* axis. The X-rays generate free radicals in the crystal which serve as quenching agents;

FIGS. 3*a* and *b* show solenoids (air core and soft iron core, respectively) in magnetic contact with, i.e., magnetically coupled to, an operative crystal. Here crystal 10, e.g., of anthracene, is magnetically coupled to a field set up in a coil 11 with terminals 12 and 13 and, in 3*b*, an iron core 14. Conventional exciting means (not shown) is also provided. When the crystal is excited, variation in the current in the solenoid causes variation in the intensity of the light emitted from the crystal. The excited crystal can be used to determine the presence or absence of an electrical current in the solenoid and, when calibrated, its magnitude;

FIG. 4 shows a permanent magnet 15, e.g., in a magnetic tape, magnetically coupled to an anthracene crystal 10. If there are variations in the strength of the field over the magnet, they are optically detectable on the crystal;

FIG. 5 shows a system for modulating light. In this system, light from a lamp 16 is passed through an input lens 17 and then through an input filter 18 to remove wavelengths shorter than those necessary to create triplet excitons in the crystal. This light is focussed by the input lens 17 into a small region of the crystal 10. Some of the annihilation luminescence from crystal 10 is collected by the output lens 17′ and directed through the output filter 19 which rejects the exciting light passed by the input filter. The intensity of this annihilation luminescence light can be modulated by the magnetic field of the solenoid which, in turn, is controlled by the magnitude of the electric current passing through the solenoid terminals 12 and 13;

FIG. 6 shows a system for reading out magnetically stored information. In this system, light from lamp 16 is passed through input lens 17 and input filter 18 to remove wavelengths shorter than those necessary to create triplet excitons in the crystal 10. The light is focussed into a small region of the crystal by input lens 17. Magnetic tape 20 is in close proximity to crystal 10. The magnetic fields from the magnetized material of the tape encounter the illuminated region of the crystal and modulate the intensity of the annihilation luminescence of the crystal. Some of the annihilation luminescence from the crystal is collected by the output lens 17′ and directed through the output filter 19 into the photodetector 21. Output filter 19, as before, rejects exciting light passed by input filter 18. The electrical output follows the annihilation luminescence intensity which, in turn, responds to the changes in magnetic field strength corresponding to information stored on tape 20. The electrical output can be processed electronically by conventional means (e.g., an oscilloscope, not shown) to present the information which has been read out of the magnetic tape through terminals 22 and 23 of photodetector 21;

FIGS. 7 and 8 show circuit elements and means for exciting the crystal. In FIG. 7 (compare FIG. 3*b*), anthracene crystal 10 is excited by visible light, e.g., having a wavelength of 6320 A. The magnitude of electric current which controls the magnetic field of the electromagnet controls the annihilation luminescence intensity (output light) which is emitted by the crystal under irradiation by the input light;

In FIG. 8, the crystal is excited electrically and triplet excitons are created in crystal 10 by recombination of charge carriers. The charge carriers are injected at electrodes 24 and 25. Electric current through terminals 12 and 13 control the magnetic field of the electromagnet which, in turn, controls the annihilation luminescence intensity (output light). The electrical input, at the injecting electrodes 24 and 25, determines the zero magnetic field intensity of the annihilation luminescence;

FIG. 9 shows a complete apparatus for determining the effects of field intensity on fluorescence emission from a crystal to give results such as those shown in FIGS. 1 and 2. In FIG. 9, a 150-Watt Xenon lamp 26 directs a light beam 27 (incident or exciting light) through a plate glass plate 28, neutral density filters 29 and 30, heat absorbing glass 31, and color filter 32 (Corning C. S. 2–62) into converging lens 33 which focuses the beam onto crystal 10 held in a vacuum box 34 provided with glass 35 (actually another Corning glass filter C. S. 2–62) and transparent. support 37. Emitted light beam 36 passes through transparent support 37 and into a Crofon (Crofon is a bundle of jacketed Lucite [poly(methyl methacrylate)] fibers frequently used as a light guide) light guide 38 and filter 38′ in box 39 and eventually into photomultiplier tube 40 (RCA 6199) coupled through output line 41 to a high voltage power supply (not shown) and a suitable recording device, e.g., Leeds and Northrup Speedomax Type G recorder, not shown. When magnetron horseshoe magnet 43 is brought into proximity with the crystal 10, variations in the output from photomultiplier tube 40 is plotted in FIG. 1 are observed;

In FIG. 10, incident light from a Xenon lamp (not shown) is fed through red color filters 32 and glass window 50 in a vacuum box 51 provided with several sealing rings 52, and Crofon light guide 55. Light guide 55 extends into a closed metal tube 56 fastened through fastener 57 to box 51 and sealed with O-ring 58. Opaque partition 59 extends almost the length of tube 56 and divides the same into two lightproof chambers. A light beam coming through light guide 55 is directed around partition 59 and onto crystal 10. This incident light causes emitted light to leave the crystal. The emitted light can be modulated by solenoid 60 in a cryostat (not shown) at low temperatures. Emitted light strikes Crofon light guide 61 extending back up into box 51 where opaque partition 62 prevents light from guide 55 from interfering with that in guide 61. Guide 61 directs the emitted light through filters 63 and 64 into photomultiplier 40 and the light is recorded as above; and FIG. 11 shows a film for determining the magnetization of a surface, the film consisting of usable crystals 70, e.g., of anthracene, embedded in an inert matrix 71, e.g., of photographic gelatin, on nonmagnetic support 72. Other suitably transparent nonmagnetic materials such as cellulose acetate, Mylar, etc., can be substituted for gelatin and, if strong enough, eliminate the need for support 72.

There follow some nonlimiting examples in which tests on various usable crystals are recorded. In low-temperature experiments, helium gas (exchange gas) in the vacuum box 51 was maintained at low pressure to facilitate cooling the crystal.

EXAMPLE 1

In the apparatus of FIG. 10, an anthracene crystal was placed in a 1-meter long stainless steel tube in the core of a Varian superconducting solenoid. Light from a xenon lamp was filtered with two Corning glass color filters, C. S. 2–62, to remove wavelengths shorter than 5900 A. and passed to the crystal through a Crofon light guide. Luminescence from the crystal was led through a second Crofon light guide and one each of Corning glass filters, C. S. 5–56, 5–57, and 4–72, to a photomultiplier tube, the output of which was amplified and recorded by conventional means. The tube containing the crystal was positioned within the core of a solenoid in a cryostat. The crystal was cooled to 4.2° K. by helium exchange gas in thermal contact with liquid helium.

The intensity of luminescence from the crystal was measured continuously as the magnetic field strength was increased from 0 to 3000 Oe, results of the tests being shown in FIG. 1*b*. The intensity of luminescence increased as the field strength was increased from zero, reached a maximum increase of 4 percent at a field of 420 Oe, and decreased upon further increase of the field returning to the zero-field value at 726 Oe and decreasing to 85 percent of the zero-field value at 3000 Oe.

EXAMPLE 2

In the apparatus of FIG. 9, an anthracene crystal contained at one end of a 1-meter copper tube was illuminated through two Corning glass color filters, C. S. 2–62, with focussed light from a 150-Watt Xenon lamp. The luminescence of the crystal was led into either a Crofon or aluminum foil light guide to a photomultiplier tube in the manner described in example 1. The crystal was at room temperature throughout the experiment. A magnetron permanent magnet was brought up to the crystal so that the magnetic field varied from zero to a maximum of about 2000 Oe. The dependence of luminescence intensity on field strength was qualitatively the same as that observed in Example 1.

EXAMPLE 3

An anthracene crystal with arrangements for illumination and detection of luminescence equivalent in all essentials to those of Example 2 was placed in an air-core solenoid. The solenoid was energized by a power supply which permitted the magnetic field to be switched on in approximately 2 msec. The magnetic field value could be varied from zero to approximately 3000 Oe. Upon switching on the magnetic field, the intensity of luminescence from the crystal changed instantaneously from the zero-field value to the value observed for the same field strength in Examples 1 and 2.

EXAMPLE 4

The experiment of Example 3 was essentially repeated with a pyrene crystal replacing the anthracene crystal. The results were essentially the same as those found in Example 3.

EXAMPLE 5

A pure anthracene crystal (about 3 × 5 × 10 mm.) was exposed to a dose of 4000 rads of X-rays and quenching free radicals generated therein. Triplet excitons were created in the irradiated crystal by illumination with He-Ne gas laser (Spectra-Physics Model 125) and the resulting delayed fluorescence was observed with a photomultiplier. The exciting light was interrupted periodically by a mechanical chopper at a frequency of ca. 85 cycles per second. The output from the photomultiplier was fed through a fixed bandpass tracking filter (Ad-Yu Electronics, Inc., Type 1034 Dual Channel Synchronous Filter driven by Type 1036 Synchronous Converter) and digital phase computer (Ad-Yu Electronics, Inc., Type 524A3) in order to measure the phase angle between the exciting light and the delayed fluorescence, said phase angle being a measure of the triplet exciton lifetime. The triplet lifetime in the irradiated crystal was measured to be 1.55 msec. compared to 22 msec. in the unirradiated crystal. A permanent horseshoe magnet was then brought up to the crystal, subjecting the same to a magnetic field of ca. 2000 Oe, and the triplet lifetime was found to be increased by ca. 8 percent over the zero-field value.

The irradiated crystal with arrangements for illumination and detection of luminescence equivalent in all essentials to those of Example 2 (FIG. 9) was placed in the magnetic field of an iron-core electromagnet, the field was varied from zero to 3500 Oe, and the resulting change in delayed fluorescence intensity was measured for several directions of the field relative to the crystal axes with the results shown in FIG. 2*a*, *b* and *c*, which also shows the results of the same measurements made on an unirradiated, but otherwise identical, crystal.

EXAMPLE 6

In apparatus essentially that of FIG. 5 except that crystal 10 was replaced by a liquid sample, a solution of anthracene in ethanol ($10^{-5}$ molar) was placed into the core of a 1-inch long solenoid with 10 layers of No. 20 enamel-coated magnet wire wound on a ½-inch-diameter fiber tube. Light from a xenon flash lamp was filtered with a Corning glass filter, C. S. 7–54 and focussed onto the sample by means of a lens. Luminescence from the sample was led through a Pyrex light guide, a camera shutter (Synchro Compur OMX) which shielded the photomultiplier during the flash, and one each of Corning glass filters, C. S. 4–72 and 5–58, to a photomultiplier tube (EMI 6255S/A), the output of which was amplified and differentiated with operational amplifiers (Tektronix Type O) and stored in the memory of a Computer of Average Transients (Varian CAT Model C–1024). The contents of the computer memory was recorded with an xy-recorder (e.g., Mosley Model 135A).

Following the release of the shutter, closure of the shutter contacts fired the flash lamp through a flash lamp triggering circuit. An auxiliary photodetector (RCA 1P28 photomultiplier) upon detection of the flash triggered the solenoid pulser circuit which applied to a current pulse of 0.1 millisecond duration to the solenoid in which a peak field of up to 7000 Oe was developed. In response to the magnetic field pulse, a corresponding pulse was observed in the differentiated delayed fluorescence signal from the sample demonstrating the modulation of the delayed fluorescence by the magnetic field.

EXAMPLE 7

A pure anthracene crystal was exposed to a dose of ca. 1200 rads of X-rays. The apparatus used was essentially that of FIG. 9 except that the irradiated crystal was placed between the wheels of a phosphorescope rotating at ca. 22 cycles per second. Triplet excitons were created for a half period with an He-Ne gas laser (Spectra Physics Model 125) and the decay of the resulting phosphorescence was observed during the other half period, through a Crofon light guide and a pair of Corning glass filters, C. S. 2–64, with a red sensitive photomultiplier (EMI 9558B, S20 response). The output of the photomultiplier was amplified with operational amplifiers (Tektronix Type O) and stored repeatedly in the memory of a Computer of Average Transients (Mnemotron CAT Model 400, Technical Measurements Corporation) operated by an external address advance of $1 \times 10^{-4}$ seconds per channel from a waveform-pulse generator (Tektronix Type 162 and 163). The contents of CAT's memory were read out with a printer (Technical Measurements Corporation, Printer Model 500), and normalized on a computer.

The triplet lifetime in the irradiated crystal was measured to be ca. 3.6 msec. to ca. 23 msec. in the unirradiated crystal. A permanent horseshoe magnet was then brought up to the crystal, subjecting it to a magnetic field of ca. 2000 Oe. With otherwise the same procedures as before, a slower decay of phosphorescent emission was obtained corresponding to an increase of ca. 6 percent of triplet lifetime over the zero field value.

EXAMPLE 8

A 9,10-diphenylanthracene crystal with arrangements for illumination and detection of luminescence equivalent in all essentials to those of Example 2 was placed in the magnetic field between the pole pieces of an electromagnet. The magnetic field strength could be varied continuously from 0 to 24 kilooersteds. The direction of the magnetic field could be changed by rotating the electromagnet. The crystal was at room temperature throughout the experiment.

The intensity of luminescence from the crystal was measured continuously as the magnetic field strength was increased from 0 to 24 kilo-oersteds. The intensity of luminescence increased as the field strength was increased from zero, reached a maximum of 113 percent of the zero-field value at a field of ca. 700 Oe, and decreased upon further increase of the field returning to the zero-field value at ca. 1700 Oe and decreasing to 80 percent of the zero-field value at ca. 4000 Oe. The intensity increased with further increase of the field to a maximum intensity of 84 percent of the zero-field value at ca. 5400 Oe and decreased upon further increase of the field to 74 percent of the zero-field value at ca. 7700 Oe. The intensity increased with further increase of the field to a maximum intensity of 80 percent of the zero-field value at ca. 11,000 Oe and decreased upon further increase of the field to 70 percent of the zero-field value at ca. 19,000 Oe. The intensity increased with further increase of the field to a maximum intensity of 74 percent of the zero-field value at ca. 22,200 Oe and decreased upon further increase of the field.

The modulation of delayed fluorescence by constant or slowly varying fields decreases in magnitude when the triplet concentration becomes so large that virtually all of the triplets produced disappear by mutual annihilation rather than by monomolecular decay. The preferred operating range for triplet concentration in these processes is a concentration less than that given by the reciprocal of the product: (annihilation rate constant at zero magnetic field) × (triplet lifetime). The magnetic field effect still occurs above this exciton concentration, but with diminished magnitude. The preferred concentration range depends on parameters characteristic of the particular material being employed and will thus be different for different materials.

Since obvious modifications and equivalents in the invention will be evident to those skilled in the art, we propose to be bound solely by the appended claims.

The embodiments of the invention in which an exclusive property or privilege is claimed are defined as follows:

1. A process for modulating the intensity of electromagnetic radiation which comprises:

a. generating triplets in a system in which triplets can be created, and in which said triplets subsequently decay with emission of electromagnetic radiation derived from delayed fluorescence or, in the presence of paramagnetic quenching, phosphorescence, and b. changing a magnetic field strength on said system thereby causing a change in the intensity of the emitted electromagnetic radiation.

2. The process of claim 1 wherein the system is a crystalline solid.

3. The process of claim 2 wherein triplet excitons are generated in the crystalline solid by exciting electromagnetic radiation.

4. The process of claim 2 wherein triplet excitons are generated in the crystalline solid electrically.

5. The process of claim 2 wherein the crystalline solid is anthracene.

6. The process of claim 2 wherein the crystalline solid is pyrene.

7. The process of claim 1 wherein the system is a solution in an inert transparent solvent of a substance in which triplets can be created.

8. The process of claim 7 wherein the system is a solution in ethanol of anthracene.

9. In combination in a device for modulating the intensity of electromagnetic radiation:

a. a system in which triplets can be created with subsequent decay and the emission of electromagnetic radiation derived from delayed fluorescence or, in the presence of paramagnetic quenching, phosphorescence;

b. means for generating triplets in said system;

c. means for establishing a magnetic field in said system; and d. means for varying the strength of the magnetic field and thereby varying the intensity of emitted electro-magnetic radiation.

10. The device of claim 9 wherein the system is a crystalline solid.

11. The device of claim 10 wherein the means for generating triplets is electromagnetic radiation.

12. The device of claim 10 wherein the means for generating triplets is electrical.

13. The device of claim 10 wherein the crystalline solid is anthracene.

14. The device of claim 10 wherein the crystalline solid is pyrene.

15. The device of claim 9 wherein the system is a solution in an inert transparent solvent of a substance in which triplets can be created.

16. The device of claim 15 wherein the system is a solution in ethanol of anthracene.

* * * * *